(12) United States Patent
Han et al.

(10) Patent No.: US 10,503,046 B2
(45) Date of Patent: *Dec. 10, 2019

(54) NANOSTRUCTURED ACOUSTO-OPTIC DEVICE, AND OPTICAL SCANNER, OPTICAL MODULATOR, AND HOLOGRAPHIC DISPLAY APPARATUS USING THE NANOSTRUCTURED ACOUSTO-OPTIC DEVICE

(71) Applicant: Samsung Electronics Co., Ltd., Suwon-si (KR)

(72) Inventors: Seung-hoon Han, Seoul (KR);
In-kyeong Yoo, Yongin-si (KR);
Sang-yoon Lee, Seoul (KR);
Hong-seok Lee, Seongnam-si (KR);
Moon Gyu Han, Yongin-si (KR);
Sun-kook Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

This patent is subject to a terminal disclaimer.

(21) Appl. No.: 15/259,116

(22) Filed: Sep. 8, 2016

(65) Prior Publication Data
US 2016/0377954 A1  Dec. 29, 2016

Related U.S. Application Data

(63) Continuation of application No. 13/360,616, filed on Jan. 27, 2012, now Pat. No. 9,477,101.

(30) Foreign Application Priority Data

Jan. 28, 2011  (KR) .................. 10-2011-0008956

(51) Int. Cl.
*G03H 1/10* (2006.01)
*G02B 26/10* (2006.01)
(Continued)

(52) U.S. Cl.
CPC .............. *G02F 1/335* (2013.01); *B82Y 20/00* (2013.01); *G02B 27/22* (2013.01); *G02F 1/11* (2013.01);
(Continued)

(58) Field of Classification Search
CPC . G02F 1/017; G02F 1/11; G02F 1/116; G02F 1/133; G02F 2202/36;
(Continued)

(56) References Cited

U.S. PATENT DOCUMENTS 5,101,294 A  3/1992 Jain et al.
5,106,181 A  4/1992 Rockwell, III
(Continued)

FOREIGN PATENT DOCUMENTS

EP  0486357 A1  5/1992
JP  3-116028 A  5/1991
(Continued)

OTHER PUBLICATIONS

Neidert "Dielectric constant of semi-insulating gallium arsenide," IET, Mar. 27, 1980, Electronics Letters, vol. 16, Issue 7, pp. 244-245.
(Continued)

*Primary Examiner* — Marin Pichler
(74) *Attorney, Agent, or Firm* — NSIP Law

(57) ABSTRACT

An acousto-optic device capable of increasing a range of a diffraction angle of output light by using a nanostructured acousto-optic medium, and an optical scanner, an optical modulator, a two-dimensional/three-dimensional (2D/3D) conversion stereoscopic image display apparatus, and a holographic display apparatus using the acousto-optic device. The acousto-optic device may include a nanostructured acousto-optic medium formed by at least two different mediums repeatedly alternating with each other, wherein at
(Continued)

least one of the at least two different mediums includes an acousto-optic medium. The acousto-optic device having the aforementioned structure may increase the range of a diffraction angle of output light. Thus, various systems such as the optical scanner, the optical modulator, the 2D/3D conversion stereoscopic image display apparatus, and the holographic display apparatus may not require a separate optical system to increase an operational angle range, thereby decreasing a size of the system and/or improving a resolution of the system.

22 Claims, 7 Drawing Sheets

(51) Int. Cl.
| | | |
|---|---|---|
| *G02F 1/33* | (2006.01) | |
| *G02F 1/335* | (2006.01) | |
| *B82Y 20/00* | (2011.01) | |
| *G02F 1/11* | (2006.01) | |
| *G02B 27/22* | (2018.01) | |
| *G02F 1/29* | (2006.01) | |
| *G03H 1/22* | (2006.01) | |
| *G02F 1/017* | (2006.01) | |

(52) U.S. Cl.
CPC ........... *G02F 1/292* (2013.01); *G03H 1/2286* (2013.01); *G02F 1/017* (2013.01); *G02F 2001/291* (2013.01); *G02F 2202/36* (2013.01); *G02F 2202/40* (2013.01); *G02F 2202/42* (2013.01); *G02F 2203/22* (2013.01); *G03H 2001/2292* (2013.01); *Y10S 977/834* (2013.01)

(58) Field of Classification Search
CPC ........ G02F 1/01708; G02F 1/125; G02F 1/33; G02F 1/332; G02F 1/335; G02F 1/292; G02F 2001/291; G02F 2201/36; G02F 2201/40; G02F 2201/42; G02F 2203/22; B82Y 20/00; G02B 27/22; Y10S 977/834; G03H 1/2286; G03H 2001/2292; H04N 1/1275
USPC .................. 359/285–287, 298, 305–314; 385/285–287, 298, 305–314, 7
See application file for complete search history.

(56) References Cited

U.S. PATENT DOCUMENTS

| | | |
|---|---|---|
| 5,130,843 A | 7/1992 | He et al. |
| 5,233,582 A | 8/1993 | Tanno et al. |
| 5,406,194 A | 4/1995 | Dykaar et al. |
| 5,802,222 A | 9/1998 | Rasch et al. |
| 7,894,125 B2 | 2/2011 | Langdon |
| 2001/0026659 A1 | 10/2001 | Sekine et al. |
| 2002/0023903 A1 | 2/2002 | Ann Ngoi et al. |
| 2002/0136931 A1 | 9/2002 | Eisenbeiser et al. |
| 2006/0018182 A1 | 1/2006 | Kieffer et al. |
| 2006/0072114 A1 | 4/2006 | Sigalas et al. |
| 2007/0280319 A1 | 12/2007 | Sekiguchi et al. |
| 2008/0112713 A1 | 5/2008 | Guo |
| 2009/0219607 A1 | 9/2009 | Saggau et al. |
| 2009/0284826 A1 | 11/2009 | Langdon |
| 2010/0086272 A1 | 4/2010 | Li et al. |
| 2010/0133532 A1 | 6/2010 | Ahn |
| 2010/0164636 A1 | 7/2010 | Sekiguchi et al. |
| 2011/0090926 A1 | 4/2011 | Sekiguchi |

FOREIGN PATENT DOCUMENTS

| | | |
|---|---|---|
| JP | 2008-177551 A | 7/2008 |
| JP | 2010-532561 A | 10/2010 |
| KR | 97-702668 A | 5/1997 |
| KR | 10-0878912 B1 | 1/2009 |
| WO | WO 96/25009 A1 | 8/1996 |

OTHER PUBLICATIONS

Jain et al., "Multiple Quantum Well Spatial Light Modulator Structures using Surface Acoustic Wave Induced Stark Effect," Proc. SPIE 1151, Optical Information Processing Systems and Architectures, 495, Feb. 5, 1990.

Armenise et al. "Accurate modeling of acousto-optic interaction in lossy multilayer structures" Proc. SPIE 1794, Integrated Optical Circuits II, 252, Apr. 6, 1993.

Tsai et al., "Guided-wave two-dimensional acousto-optic scanner using proton-exchanged lithium niobate waveguide." Fiber & Integrated Optics 17.3 (1998): 157-166.

Wang et al. "SAW-Induced Birefringence in InGaAs—GaAs Multiple Quantum Well Acousto-Optic Modulators," Ultrasonics Symposium, 2002. Proceedings. 2002 IEEE, conference dates Oct. 8-11, 2002.

Ali, J.Ben, et al. "Vibrational properties of (001) III-V nitride superlattices", Surface Science, North-Holland Publishing Co., Amsterdam, NL, vol. 603, No. 15, Aug. 1, 2009, pp. 2318-2326 (9 pages, in English).

European Extended Search Report dated May 2, 2012 in counterpart European Patent Application No. 12152628.9 (7 pages, in English).

European Office Action dated Apr. 8, 2013, in counterpart European Application No. 12 152 628.9 (7 pages, in English).

Korean Office Action dated Mar. 30, 2017 in Corresponding Korean Patent Application No. 10-2011-0008956 (7 pages in English and 91 pages in Korean).

Tsai, C. S. "Guided-Wave Two-Dimensional Acousto-Optic Scanner Using Proton-Exchanged Lithium Niobate Waveguide." *Fiber & Integrated Optics* 17.3 (1998): 157-166. (10 pages, in English).

Korean Office Action dated Jan. 22, 2018 in counterpart Korean Patent Application No. 10-2017-0138502 (12 pages, in Korean with English translation).

2D          3D

NANOSTRUCTURED ACOUSTO-OPTIC DEVICE, AND OPTICAL SCANNER, OPTICAL MODULATOR, AND HOLOGRAPHIC DISPLAY APPARATUS USING THE NANOSTRUCTURED ACOUSTO-OPTIC DEVICE

CROSS-REFERENCE TO RELATED APPLICATIONS

This application is a continuation of U.S. patent application Ser. No. 13/360,616 filed on Jan. 27, 2012, which claims the benefit of Korean Patent Application No. 10-2011-0008956 filed on Jan. 28, 2011, in the Korean Intellectual Property Office, the disclosure of which is incorporated herein in its entirety by reference.

BACKGROUND

1. Field

This disclosure relates to a nanostructured acousto-optic device, and an optical scanner, an optical modulator, a two-dimensional/three-dimensional (2D/3D) conversion stereoscopic image display apparatus, and a holographic display apparatus using the nanostructured acousto-optic device, and more particularly, to an acousto-optic device, and an optical scanner, an optical modulator, a two-dimensional/three-dimensional (2D/3D) conversion stereoscopic image display apparatus, and a holographic display apparatus using the nanostructured acousto-optic device capable of increasing a range of a diffraction angle of output light or adjusting a diffraction angle characteristic of the output light by using a nanostructured acousto-optic medium.

2. Description of the Related Art

The acousto-optic effect is an effect in which a refractive index of light is periodically varied in a medium by a series of compressions and rarefactions in the medium produced by sonic waves such as ultrasonic waves propagating in the medium. The series of compressions and rarefactions produces a phase grating in the medium, which diffracts light incident on the medium. In general, a medium having the acousto-optic effect is called an acousto-optic medium. An intensity and a diffraction angle of diffracted light produced by the phase grating in the medium depend on an intensity of the sonic waves and a frequency of the sonic waves, respectively. Thus, an acousto-optic device having a sonic wave generator such as an ultrasonic wave generator on a surface of the medium having the aforementioned characteristic may be used in an optical modulator for modulating the amplitude of incident light, or in an optical scanner for deflecting incident light, or in a holographic display apparatus for displaying a holographic image.

However, acousto-optic devices that use raw mediums existing in the natural world have a limitation in a diffraction angle of output light due to a limited optical anisotropy and a limited acousto-optic coefficient of the mediums. That is, in an acousto-optic medium according to the related art, a range of a diffraction angle of output light is narrow. Thus, when an acousto-optic device according to the related art is used in various optical application fields, including an optical scanner, an optical modulator, a holographic display apparatus, or the like, a separate optical system is required to compensate for the narrow range of the diffraction angle. This separate optical system increases a size of the system and/or may reduce a resolution of the system.

SUMMARY

Disclosed is an acousto-optic device in which a range of a diffraction angle of output light is increased by using a nanostructured acousto-optic medium.

Also disclosed are an optical scanner, an optical modulator, a two-dimensional/three-dimensional (2D/3D) conversion stereoscopic image display apparatus, and a holographic display apparatus using the acousto-optic device.

According to an aspect of the invention, an acousto-optic device includes a first medium and a second medium repeatedly alternating with each other and having different dielectric constants; and a sonic wave generator to apply sonic waves to the first medium and the second medium; wherein the first medium and/or the second medium is formed of an acousto-optic medium.

The first medium and the second medium may repeatedly alternate with each other in a propagation direction of the sonic waves applied by the sonic wave generator.

The sonic wave generator may be disposed on a surface of a first one of the first medium if the first one of the first medium precedes a first one of the second medium in the propagation direction of the sonic waves, or may be disposed on a surface of the first one of the second medium if the first one of the second medium precedes the first one of the first medium in the propagation direction of the sonic waves; and the surface on which the sonic wave generator is disposed may be perpendicular to the propagation direction of the sonic waves.

The first medium may be formed of an acousto-optic medium; and the second medium may be formed of an acousto-optic medium, or air, or a material having a dielectric constant with a real part having a negative value.

The second medium may be formed of the material having a dielectric constant with a real part having a negative value; and the material having a dielectric constant with a real part having a negative value may include a material selected from the group consisting of Al, Ag, Au, Cu, Na, Ka, ITO, AZO, GZO, graphene, and an alloy of any of Al, Ag, Au, Cu, Na, and Ka.

The first medium and/or the second medium may include a material selected from the group consisting of GaN, $Al_{1-x}Ga_xN$, $In_{1-x}Ga_xN$, ZnO, and an organic crystal.

The first medium and the second medium may repeatedly alternate with each other in a direction that is perpendicular to a propagation direction of the sonic waves applied by the sonic wave generator.

The sonic wave generator may be disposed on a surface formed by alternating surfaces of the first medium and the second medium; and the surface on which the sonic wave generator disposed may be perpendicular to the propagation direction of the sonic waves.

The first medium may have a dielectric constant with a real part having a first sign; and the second medium may have a dielectric constant with a real part having a second sign opposite to the first sign.

The first medium may have a relatively large acousto-optic coefficient; and the second medium may have a relatively small acousto-optic coefficient.

A period in which the first medium and the second medium alternate with each other may be smaller than a wavelength of light to be controlled by the acousto-optic device; and the period may be a sum of a thickness of one of the first medium in a direction in which the first medium and the second medium alternate with each other, and a thickness of one of the second medium in the direction in which the first medium and the second medium alternate with each other.

The acousto-optic device may further include at least one additional medium repeatedly alternating with the first medium and the second medium and having a dielectric constant different from the dielectric constants of the first medium and the second medium.

The acousto-optic device may be an optical modulator to amplitude-modulate light that is incident on the optical modulator.

According to another aspect of the invention, an optical scanner includes an optical waveguide; an optical coupling device to make light incident on the optical waveguide; a first acousto-optic device as described above disposed in the optical waveguide to deflect the light incident on the optical waveguide in a first direction; and a second acousto-optic device as described above disposed in the optical waveguide to deflect the light deflected by the first acousto-optic device in a second direction that is perpendicular to the first direction.

The optical scanner may further include a substrate in which the optical waveguide is disposed.

The first acousto-optic device may include a first sonic wave generator; the second acousto-optic device may include a second sonic wave generator; the first sonic wave generator may be disposed on a top surface of the substrate adjacent to a surface of the first acousto-optic device; and the second sonic wave generator may be disposed on a top surface of the waveguide adjacent to a surface of the second acousto-optic device.

The optical coupling device may be disposed to face a light-incident surface of the optical waveguide to make light incident onto the light-incident surface of the optical waveguide.

The optical coupling device may include a lens to focus light onto the light-incident surface of the optical waveguide.

The optical coupling device may include a diffracting optical device to diffract light onto the light-incident surface of the optical waveguide.

The diffracting optical device may include a Fresnel lens, a slit, or a prism.

The optical waveguide may include a first clad layer and a second clad layer having relatively small refractive indexes; and a core layer disposed between the first clad layer and the second clad layer and having a relatively large refractive index.

The first acousto-optic device and the second acousto-optic device may be disposed in the core layer of the optical waveguide.

The first acousto-optic device and the second acousto-optic device may be disposed in the core layer, the first clad layer, and the second clad layer of the optical waveguide.

The optical waveguide may include a first clad layer and a second clad layer having relatively large refractive indexes; and a core layer disposed between the first clad layer and the second clad layer and having a relatively small refractive index.

According to another aspect of the invention, a two-dimensional/three-dimensional (2D/3D) conversion stereoscopic image display apparatus includes a display panel; and an acousto-optic device array disposed on an entire display surface of the display panel to deflect an image to be displayed on the display panel; wherein the acousto-optic device array includes a plurality of acousto-optic devices as described above.

Each one of the acousto-optic devices may extend in a horizontal direction of the display panel; and the plurality of acousto-optic devices may be arrayed in a vertical direction of the display panel.

Each one of the acousto-optic devices may correspond to one row of pixels of the display panel.

Each one of the acousto-optic devices may correspond to a plurality of pixels forming a part of one row of pixels of the display panel.

According to another aspect of the invention, a holographic display apparatus includes a light source to emit light; an acousto-optic device array to deflect the light emitted from the light source, the acousto-optic device array including a plurality of acousto-optic devices as described above; and a projection optical system to project the light deflected by the acousto-optic device array.

Each one of the acousto-optic devices may extend in a horizontal direction; and the plurality of acousto-optic devices may be arrayed in a vertical direction.

Each one of the acousto-optic devices may correspond to one hologram row in a horizontal direction of a hologram image to be displayed by the holographic display apparatus.

Each one of the acousto-optic devices may correspond to a part of one hologram row in a horizontal direction of a hologram image to be displayed by the holographic display apparatus.

According to another aspect of the invention, an acousto-optic device includes a first medium and a second medium repeatedly alternating with each other to form a stacked structure, the first medium and/or the second medium being formed of an acousto-optic medium; and a sonic wave generator to apply sonic waves to the stacked structure to form a phase grating in the stacked structure to diffract light incident on the stacked structure.

A diffraction angle of the light diffracted by the phase grating formed in the stacked structure may be greater than a diffraction angle of light diffracted by a phase grating formed in only the first medium having a same period as the phase grating formed in the stacked structure, and may also be greater than a diffraction angle of light diffracted by a phase grating formed in only the second medium having a same period as the phase grating formed in the stacked structure.

The first medium and the second medium may have different dielectric constants.

The sonic generator may be disposed on a first surface of the stacked structure that is perpendicular to a direction in which the first medium and the second medium repeatedly alternate with each other so that the first medium and the second medium repeatedly alternate with each other in a propagation direction of the sonic waves; and the light incident on the stacked structure may be incident on a second surface of the stacked structure that is perpendicular to the first surface of the stacked structure.

The sonic generator may be disposed on a first surface of the stacked structure that is parallel to a direction in which the first medium and the second medium repeatedly alternate with each other so that the first medium and the second medium repeatedly alternate with each other in a direction that is perpendicular to a propagation direction of the sonic waves; and the light incident on the stacked structure may be incident on a second surface of the stacked structure that is perpendicular to the first surface of the stacked structure.

A period in which the first medium and the second medium alternate with each other may be smaller than a wavelength of the light incident on the stacked structure; and the period may be a sum of a thickness of one of the first medium in a direction in which the first medium and the second medium alternate with each other, and a thickness of one of the second medium in the direction in which the first medium and the second medium alternate with each other.

Additional aspects will be set forth in part in the description that follows and, in part, will be apparent from the description, or may be learned by practice of the described embodiments.

BRIEF DESCRIPTION OF THE DRAWINGS

The above and/or other aspects will become apparent and more readily appreciated from the following description of embodiments taken in conjunction with the accompanying drawings of which:

FIG. 9 illustrates an example in which the acousto-optic device of FIG. 1 and/or FIG. 3 is applied to a two-dimensional/three-dimensional (2D/3D) conversion stereoscopic image display apparatus according to an embodiment of the invention; and FIG. 10 illustrates an example in which the acousto-optic device of FIG. 1 and/or FIG. 3 is applied to a holographic 3D display apparatus according to an embodiment of the invention.

DETAILED DESCRIPTION

Figure 1:
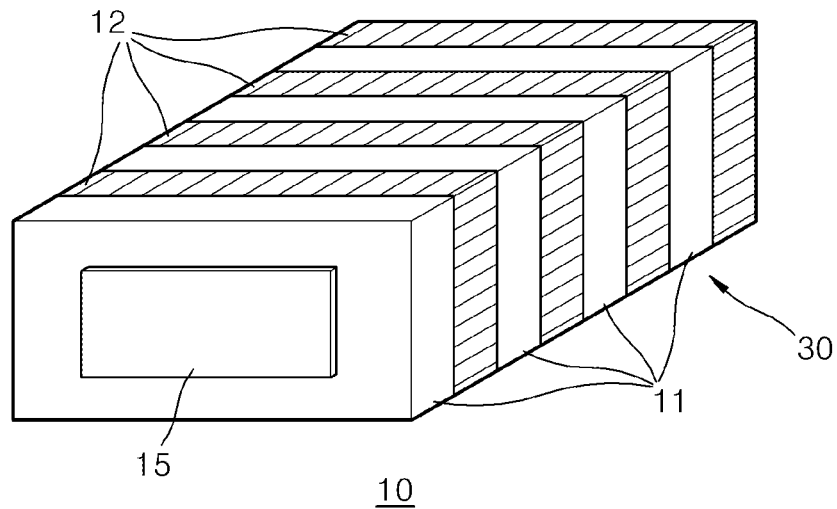
FIG. 1 is a perspective view of a structure of an acousto-optic device according to an embodiment of the invention.

Reference will now be made in detail to embodiments of a nanostructured acousto-optic device, and an optical scanner, an optical modulator, a two-dimensional/three-dimensional (2D/3D) conversion stereoscopic image display apparatus, and a holographic display apparatus using the nanostructured acousto-optic device, examples of which are illustrated in the accompanying drawings. In the drawings, like reference numerals in the drawings denote like elements, and the size of each component may be exaggerated for clarity.

As used herein, the term "and/or" includes any and all combinations of one or more of the associated listed items.

FIG. 1 is a perspective view of a structure of an acousto-optic device 10 according to an embodiment of the invention. Referring to FIG. 1, the acousto-optic device 10 includes a nanostructured acousto-optic medium 30 and a sonic wave generator 15 for applying sonic waves to the nanostructured acousto-optic medium 30. The nanostructured acousto-optic medium 30 includes a first medium 11 and a second medium 12 that are alternately disposed and have different dielectric constants. The sonic wave generator 15 is disposed on a surface of the nanostructured acousto-optic medium 30 that is perpendicular to a direction in which the first medium 11 and the second medium 12 are alternately disposed, i.e., a stacking direction of the first medium 11 and the second medium 12. Thus, the first medium 11 and the second medium 12 are repeatedly disposed while alternating with each other in a direction that is parallel to a propagation direction of sonic waves. For example, the sonic wave generator 15 may be disposed on a surface of a first one of the first medium 11 disposed in the nanostructured acousto-optic medium 30 that is perpendicular to the stacking direction and forms one end surface of the nanostructured acousto-optic medium 30 as shown in FIG. 1. However, the invention is not limited to this specific structure. For example, the sonic wave generator 15 may be disposed on the other end surface of the nanostructured acousto-optic medium 30 in FIG. 1.

As used herein, the term "nanostructured" denotes a structure having a dimension generally on the order of 5 nm to 500 nm. However, the invention is not limited to this exact range.

As used herein, the term "dielectric constant" denotes a frequency-dependent relative permittivity c at a frequency of light to be controlled by the acousto-optic device 10. If light having a range of wavelengths is to be controlled by the acousto-optic device 10, the dielectric constant may be a frequency-dependent relative permittivity c at a lowest frequency of the light having the range of wavelengths, i.e. a frequency of the light having the longest wavelength of the range of wavelengths. Alternatively, the dielectric constant may be a frequency-dependent relative permittivity c at a highest frequency of the light having the range of wavelengths, i.e. a frequency of the light having the shortest wavelength of the range of wavelengths. Alternatively, the dielectric constant may be a frequency-dependent relative permittivity c at any frequency of the light having the range of wavelengths, i.e. a frequency of light having any wavelength between the longest wavelength and the shortest wavelength of the range of wavelengths, such as, for example, a frequency of light having a wavelength halfway between the longest wavelength and the shortest wavelength of the range of wavelengths.

One of the first medium 11 and the second medium 12 may be formed of an acousto-optic medium having a relatively large acousto-optic coefficient. The other one of the first medium 11 and the second medium 12 may be formed of an acousto-optic medium having a relatively small acousto-optic coefficient, and may even be formed of a material (e.g., air) having a lowest possible acousto-optic coefficient. The acousto-optic coefficient quantitatively characterizes the acousto-optic effect, which is a dependence of refractive index on pressure, $n=n(p)$, or on density, $n=n(\rho)$, and is expressed by $\gamma = \delta n/\delta p$ or $\gamma = \delta n/\lambda \rho$. Alternatively, the acousto-optic coefficient may be expressed by $M_2 = p^2 n^6 / \rho v^3$, where p is the photoelastic constant of the medium, n is the undisturbed refractive index of the medium, $\rho$ is the density of the medium, and v is the velocity of sound in the medium. The higher $M_2$ is, the less acoustic power is required to produce a given change in the refractive index of the medium. An $M_2$ of air is substantially 0. The medium having the relatively large acousto-optic coefficient may have an $M_2$ of about 5, and the medium having the relatively small acousto-optic coefficient may have an $M_2$ of about 0.01. A ratio of an $M_2$ of the medium having the relatively large acousto-optic coefficient to an $M_2$ of the medium having the relatively small acousto-optic coefficient may be about 500 or more. However, the invention is not limited to these exact values.

Also, according to this embodiment, the first medium 11 and the second medium 12 may have dielectric constants with real parts having different signs. For example, one of the first medium 11 and the second medium 12 may have a dielectric constant with a real part having a positive value, and the other one of the first medium 11 and the second medium 12 may have a dielectric constant with a real part having a negative value. Examples of a material having a dielectric constant with a real part having a negative value include a metal such as Al, Ag, Au, Cu, Na, or Ka, an alloy of any of Al, Ag, Au, Cu, Na, and Ka, a semiconductor such as indium tin oxide (ITO), aluminum-doped zinc oxide (AZO), gallium zinc oxide (GZO), graphene, or the like. Examples of a material having a dielectric constant with a real part having a positive value include a group III-V semiconductor such as GaN, $Al_{1-x}Ga_xN$, $In_{1-x}Ga_xN$, or the like, zinc oxide (ZnO), or an organic crystal, such as an excited-state intramolecular proton-transfer material. Also, the group III-V semiconductor such as GaN, $Al_{1-x}Ga_xN$, $In_{1-x}Ga_xN$, or the like, zinc oxide (ZnO), or the organic crystal, such as an excited-state intramolecular proton-transfer material, may operate as a gain material enabling optical amplification of light being controlled by the acousto-optic device 10. The optical amplification may be achieved via optical pumping by shining light having a different wavelength than the wavelength of the light being controlled by the acousto-optic device 10 onto the acousto-optic device 10. Alternatively, the optical amplification may be achieved via electrical pumping by applying an electric field to the acousto-optic device 10 via electrodes provided on the acousto-optic device.

A pitch or period at which the first medium 11 and the second medium 12 alternate with each other (i.e., a sum of a thickness of the first medium 11 and a thickness of the second medium 12) may be considerably smaller than a wavelength of light (e.g., visible light) to be controlled by the acousto-optic device 10. For example, the pitch or period may be at least two times smaller than the wavelength of the light to be controlled by the acousto-optic device 10.

Figure 11:
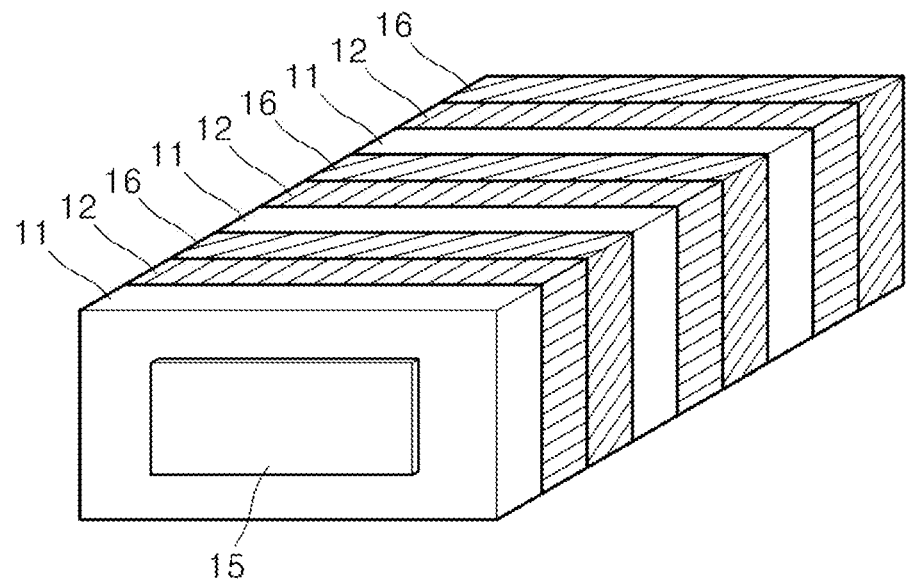
FIGS. 11 and 12 are diagrams illustrating examples of structures of an acousto-optic device.
Figure 12:
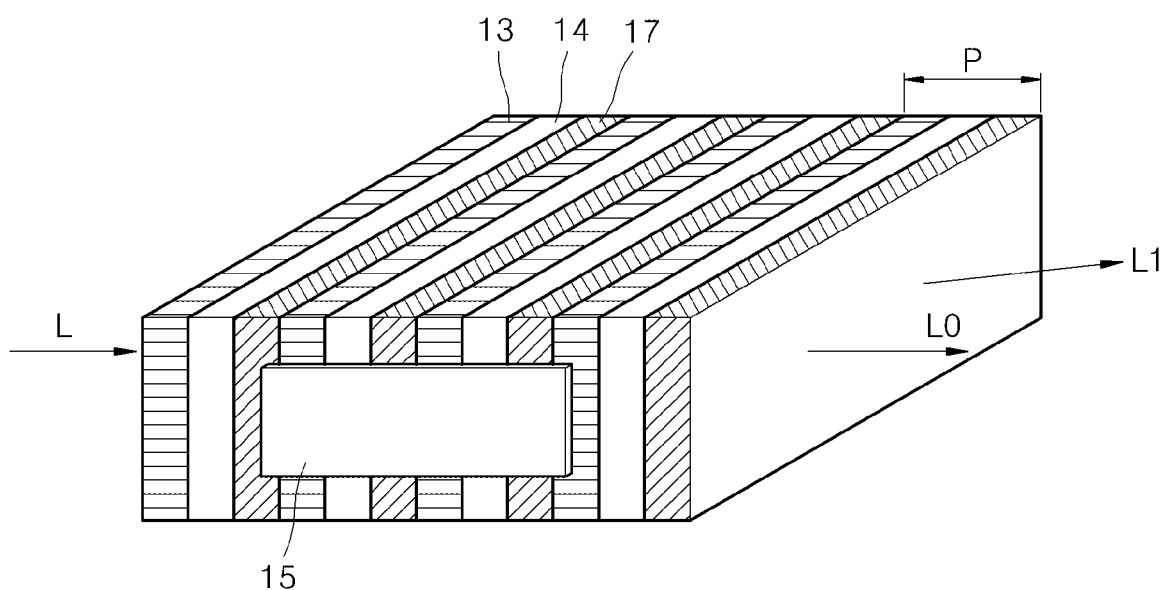

For convenience of description, FIG. 1 illustrates a case in which the first medium 11 and the second medium 12 having different dielectric constants alternate with each other, but three or more mediums, such as, for example, third medium 16 and 17 shown in FIGS. 11 and 12, respectively, having different dielectric constants may alternate with each other. In this case, at least one of the three or more mediums, 11, 12, and 16 or 13, 14, and 17, may be formed of an acousto-optic material having a relatively large acousto-optic coefficient compared to the other one(s) of the three or more mediums, 11, 12, and 16 or 13, 14, and 17. Also, at least one of the three or more mediums, 11, 12, and 16 or 13, 14, and 17, may be formed of a material having a relatively small acousto-optic coefficient compared to the other one(s) of the three or more mediums, or a material (e.g., air) having a lowest possible acousto-optic coefficient. A period in which the three or more mediums, 11, 12, and 16 or 13, 14, and 17, alternate with each other (i.e., a sum of respective thicknesses of the three or more mediums) may be considerably smaller than a wavelength of incident light (e.g., visible light) to be controlled by the acousto-optic device 10. For example, the period may be at least two times smaller than the wavelength of the light to be controlled by the acousto-optic device 10.

The first medium 11 and the second medium 12 may be disposed according to a random order. Thus, although FIG. 1 illustrates a case in which a first one of the first medium 11 is the first medium disposed in the nanostructured acousto-optic medium 30 and the sonic wave generator 15 is disposed on a surface of the first one of the first medium 11 that is perpendicular to the stacking direction of the first medium 13 and the second medium 14, if a first one of the second medium 12 is the first medium disposed in the nanostructured acousto-optic medium 30, the sonic wave generator 15 may be disposed on a surface of the first one of the second medium 12 that is perpendicular to the stacking direction. The sonic wave generator 15 may be an electro-acoustic modulator capable of generating sonic waves such as ultrasonic waves according to an electrical signal applied thereto. As illustrated in the acousto-optic device 10 of FIG. 1, the sonic wave generator 15 is disposed so that the sonic waves generated by the sonic wave generator 15 propagate in a stacking direction of the first medium 11 and the second medium 12.

Figure 2:
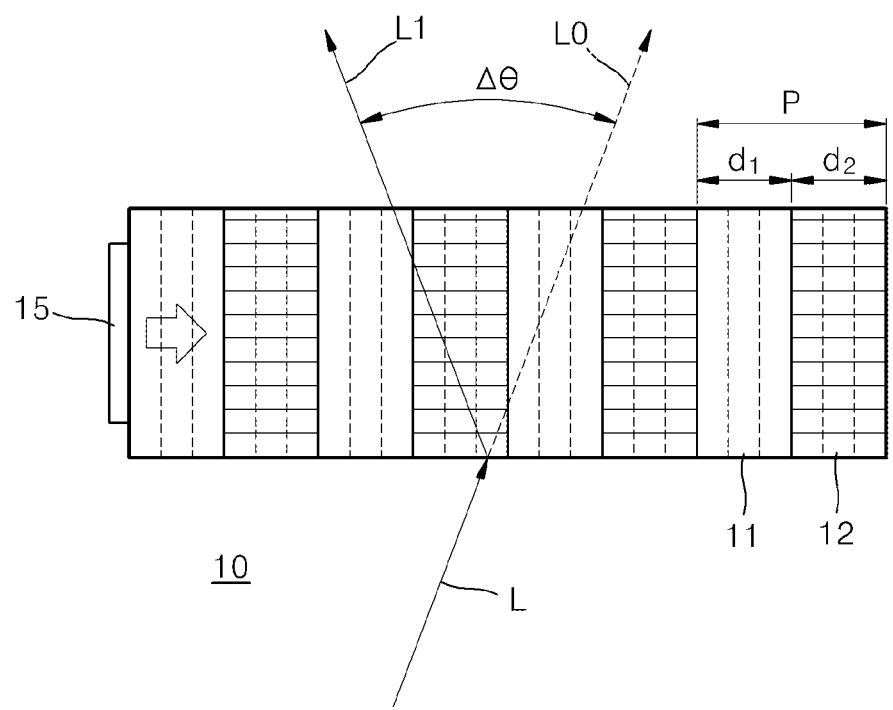
FIG. 2 is a cross-sectional view illustrating an operation of the acousto-optic device of FIG. 1.

FIG. 2 is a cross-sectional view illustrating an operation of the acousto-optic device 10 of FIG. 1. Referring to FIG. 2, when an electrical signal is applied to the sonic wave generator 15 disposed on the surface of the nanostructured acousto-optic medium 30, sonic waves such as ultrasonic waves having a predetermined amplitude and a predetermined frequency are generated in response to the electrical signal. As illustrated in FIG. 2 by an arrow, the sonic waves generated by the sonic wave generator 15 propagate in the nanostructured acousto-optic medium 30 at a predetermined speed, causing a series of periodic compressions and rarefactions in the nanostructured acousto-optic medium 30. The series of periodic compressions and rarefactions cause a local density in the nanostructured acousto-optic medium 30 to vary, which in turn causes a local refractive index of the nanostructured acousto-optic medium 30 to vary. Accordingly, when the sonic waves propagate in the nanostructured acousto-optic medium 30, the refractive index of the nanostructured acousto-optic medium 30 periodically varies in a propagation direction of the sonic waves according to a wavelength of the sonic waves. That is, in response to the periodic series of compressions and rarefactions produced by the sonic waves, the refractive index of the nanostructured acousto-optic medium 30 is periodically increased by the compressions and decreased by the rarefactions.

The periodic variation of the refractive index of the nanostructured acousto-optic medium 30 forms a phase grating having a periodic shape in the nanostructured acousto-optic medium 30 as represented by the vertical dashed lines in FIG. 2. This phase grating diffracts light incident on the nanostructured acousto-optic medium 30. A diffraction angle and an intensity of the diffracted light will vary according to a frequency and an intensity of the sonic waves, respectively. Also, the frequency and the intensity of the sonic waves are determined by a frequency and an intensity of the electrical signal that is applied to the sonic wave generator 15. Thus, by appropriately controlling the electrical signal applied to the sonic wave generator 15, it is possible to control diffraction of light in the nanostructured acousto-optic medium 30.

As illustrated in FIG. 2, in order to diffract light incident on the nanostructured acousto-optic medium 30, the propagation direction of the sonic waves in the nanostructured acousto-optic medium 30 is transverse to a travel direction of light incident on the nanostructured acousto-optic medium 30. That is, when light is incident on a surface of the nanostructured acousto-optic medium 30 that is perpendicular to the surface of the nanostructured acousto-optic medium 30 on which the sonic wave generator 15 is disposed, the aforementioned diffraction effect may occur.

As illustrated in the acousto-optic device 10 of FIG. 2, the first medium 11 and the second medium 12 having different dielectric constants are repeatedly disposed in the propagation direction of the sonic waves. According to this embodiment, due to the repetition of the first medium 11 and the second medium 12 having different dielectric constants, a difference of refractive indexes according to an incident angle of incident light (i.e., a refractive index anisotropy) may be increased. Thus, in FIG. 2, an angle range ($\Delta\theta$) satisfying constructive interference of diffracted light may be increased so that a diffraction angle range ($\Delta\theta$) of light may be increased. For this, a pitch or period P at which the first medium 11 and the second medium 12 are periodically repeated (i.e., a sum of a thickness d1 of the first medium 11 and a thickness d2 of the second medium 12) is considerably smaller than a wavelength of the incident light. For example, the pitch or period P may be at least two times smaller than the wavelength of the incident light. By adjusting the thicknesses d1 and d2 and the dielectric constants of the first medium 11 and the second medium 12, the refractive index anisotropy and an angle range of a diffracting operation in the nanostructured acousto-optic medium 30 may be adjusted. According to this principle, a diffraction angle range ($\Delta\theta$) of a 1st order diffracted light L1 of light diffracted by the nanostructured acousto-optic medium 30 may be increased compared to a case of using only one medium.

That is, a diffraction angle range of the light diffracted by the phase grating formed in the nanostructured acousto-optic medium 30 is greater than a diffraction angle range of light diffracted by a phase grating formed in only the first medium 11, and is also greater than a diffraction angle of light diffracted by a phase grating formed in only the second medium 12. Namely, the range of phase grating period satisfying constructive interference of 1st order diffraction of light is greater for the case of nanostructured acousto-optic medium rather than for the case of using only the first medium or second medium.

Figure 3:
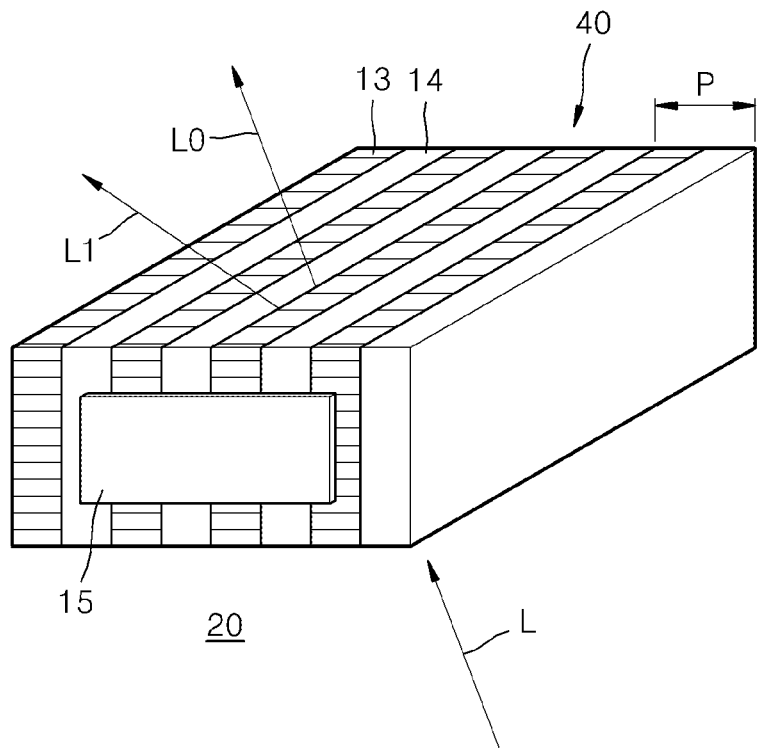
FIG. 3 is a perspective view of a structure of an acousto-optic device according to another embodiment of the invention.

FIG. 3 is a perspective view of a structure of an acousto-optic device 20 according to another embodiment of the invention. The acousto-optic device 20 of FIG. 3 is similar to the acousto-optic device 10 of FIG. 1, but is different with respect to a direction in which a first medium 13 and a second medium 14 are repeatedly disposed while alternating with each other in a nanostructured acousto-optic medium 40. That is, as illustrated in FIG. 3, the first medium 13 and the second medium 14 are repeatedly disposed while alternating with each other in a direction that is perpendicular to a propagation direction of sonic waves. The sonic wave generator 15 is disposed on a surface of the nanostructured acousto-optic medium 40 that is parallel to a direction in which the first medium 13 and the second medium 14 are alternately disposed, i.e., a stacking direction of the first medium 13 and the second medium 14. In other words, the sonic wave generator 15 is disposed on a surface of the nanostructured acousto-optic medium 40 formed by alternating surfaces of the first medium 13 and the second medium 14. Like in the acousto-optic device 10 of FIG. 1, light that is incident on a surface of the nanostructured acousto-optic medium 40 that is perpendicular to a surface of the nanostructured acousto-optic medium 40 on which the sonic wave generator 15 is disposed may be diffracted. Thus, the propagation direction of the sonic waves in the nanostructured acousto-optic medium 40 is transverse to a travel direction of the light incident on the nanostructured acousto-optic medium 40. However, the invention is not limited to this specific structure. For example, although FIG. 3 shows the sonic wave generator 15 being disposed on one end surface of the nanostructured acousto-optic medium 40, the sonic wave generator may be disposed on the other end surface, or the top surface, or the bottom surface of the nanostructured acousto-optic medium 40 in FIG. 3 to achieve the same effect. Also, the sonic wave generator 15 may be disposed on either of the side surfaces of the nanostructured acousto-optic medium 40, in which case the first medium 13 and the second medium 14 will be repeatedly disposed while alternating with each other in a direction that is parallel to a propagation direction of sonic waves as is the case in FIG. 1.

The acousto-optic devices 10 and 20 illustrated in FIGS. 1 and 3 may be used in various applications.

For example, the acousto-optic devices 10 and 20 may adjust an intensity of 0th order diffracted light according to a diffraction level of light, so that the acousto-optic devices 10 and 20 may function as an optical modulator with respect to 0th order diffracted light. For example, if sonic waves are not applied to the acousto-optic devices 10 and 20, incident light is not diffracted, so that the incident light may pass through the acousto-optic devices 10 and 20 as 0th order diffracted light without significant loss. In a case where incident light is diffracted by applying sonic waves to the acousto-optic devices 10 and 20, 1st order diffracted light is generated so that an intensity of the 0th order diffracted light passing through the acousto-optic devices 10 and 20 is decreased. If further energy is distributed to the 1st order diffracted light according to a diffraction level of light, the intensity of the 0th order diffracted light may be further decreased. Thus, the acousto-optic devices 10 and 20 may function as an optical modulator that amplitude-modulates the intensity of the 0th order diffracted light. Since the intensity of the 1st order diffracted light increases as the intensity of the 0th order diffracted light decreases, and the intensity of the 1st order diffracted light decreases as the intensity of the 0th order diffracted light increases, the acousto-optic devices 10 and 20 may also function as an optical modulator that amplitude-modulates the intensity of the 1st order diffracted light.

Also, the acousto-optic devices 10 and 20 may be applied to an optical scanner that deflects incident light to different angles by varying a diffraction angle of 1st order diffracted light. In particular, when the acousto-optic devices 10 and 20 are applied to the optical scanner, an operational range (i.e., a scanning range) of the optical scanner may be increased so that a structure of an optical system used in the optical scanner may become simple. In particular, a separate optical system that is necessary to increase the operational or scanning range in the related art may not be required.

Figure 4:
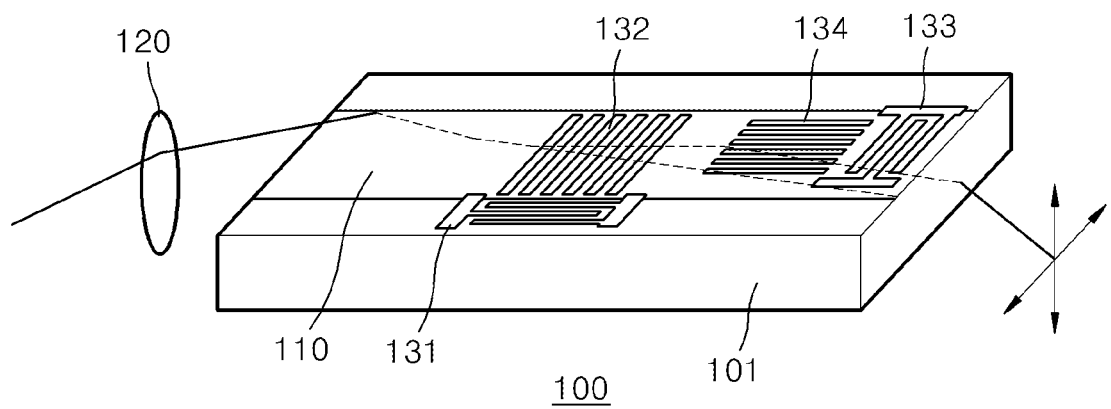
FIG. 4 is a perspective view of an optical scanner using the acousto-optic device of FIG. 1 and/or FIG. 3 according to an embodiment of the invention.

FIG. 4 is a perspective view of an optical scanner 100 using the acousto-optic device 10 of FIG. 1 and/or the acousto-optic device 20 of FIG. 3 according to an embodiment of the invention. Referring to FIG. 4, the optical scanner 100 includes a substrate 101, an optical waveguide 110 disposed in the substrate 101, an optical coupling device 120 to make light incident on the optical waveguide 110, a first acousto-optic device 132 disposed in the optical waveguide 110 to deflect light in a horizontal direction, and a second acousto-optic device 134 disposed in the optical waveguide 110 to deflect light in a vertical direction. The first acousto-optic device 132 includes a first sonic wave generator 131 to apply sonic waves to the first acousto-optic device 132, and the second acousto-optic device 134 includes a second sonic wave generator 133 to apply sonic waves to the second acousto-optic device 134. The second acousto-optic device 134 receives light that has been horizontally deflected by the first acousto-optic device 133, and deflects the horizontally deflected light in the vertical direction. The vertically deflected light from the second acousto-optic device 134 is output from the optical waveguide 110. Thus, the first acousto-optic device 133 may adjust a horizontal angle of the output light of the optical scanner 100, and the second acousto-optic device 134 may adjust a vertical angle of the output light of the optical scanner 100. The first acousto-optic device 132 and the second acousto-optic device 134 may be formed of any one of the acousto-optic devices 10 and 20 of FIGS. 1 and 3. As illustrated in FIG. 4, the first sonic wave generator 131 may be disposed on the substrate 101 adjacent to a surface of the first acousto-optic device 132, and the second sonic wave generator 133 may be disposed on the optical waveguide 110 adjacent to a surface of the second acousto-optic device 134. Although FIG. 4 shows light being incident on one end surface of the optical waveguide 110, the light may be incident on the other end surface, or the top surface, or the bottom surface of the optical waveguide 110.

Figure 5:
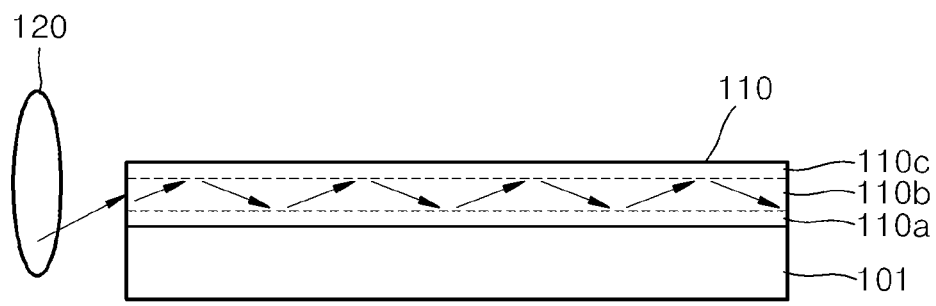
FIG. 5 is a cross-sectional view illustrating how light travels in an optical waveguide of the optical scanner of FIG. 4 taken in a direction parallel to a light travel direction.

FIG. 5 is a cross-sectional view illustrating how light travels in the optical waveguide 110 of the optical scanner 100 of FIG. 4 taken in a direction parallel to a light travel direction. For convenience of description, the cross-sectional view of FIG. 5 does not illustrate the first acousto-optic device 132 and the second acousto-optic device 134 in the optical waveguide 110 or the first sonic wave generator 131 and the second sonic wave generator 133, but only illustrates a cross-sectional structure of the substrate 101, the optical waveguide 110, and the optical coupling device 120. Referring to FIG. 5, light emitted from an external light source (not shown) is incident on the optical coupling device 120, which faces a light-incident surface of the optical waveguide 110. The optical coupling device 120 makes the light emitted from the external light source incident on a light-incident surface of the optical waveguide 110. For example, the optical coupling device 120 may be a focusing optical device such as a lens that focuses the light onto the light-incident surface of the optical waveguide 110. However, instead of the lens, the optical coupling device 120 may be a diffracting optical device such as a Fresnel lens, a grating coupler, a slit, or a prism that diffracts the light onto the light-incident surface of the optical waveguide 110.

The light incident on the optical waveguide 110 travels in the optical waveguide 110 by being totally reflected. For example, as illustrated in FIG. 5, the optical waveguide 110 may be formed of a first clad layer 110a and a second clad layer 110c having relatively small refractive indexes, and a core layer 110b having a relatively large refractive index compared to the refractive indexes of the first clad layer 110a and the second clad layer 110c. By doing so, according to the same principle of a general optical waveguide such as an optical fiber, the light may travel in the core layer 110b while being totally reflected at interfaces between the core layer 110b and the first layer 110a and the second clad layer 110c. Also, the first clad layer 110a and the second clad layer 110c may have larger refractive indexes than a refractive index of the core layer 110b disposed therebeween, and in this case, the light may also travel in the core layer 110b according to the principle of slot-type optical waveguide. In every case, a nanostructured acousto-optic medium of one of the first acousto-optic device 132 and the second acousto-optic device 134 may be formed as the core layer 110b, or may be formed as the core layer 110b, the first clad layer 110a, and the second clad layer 110c.

Figure 6:
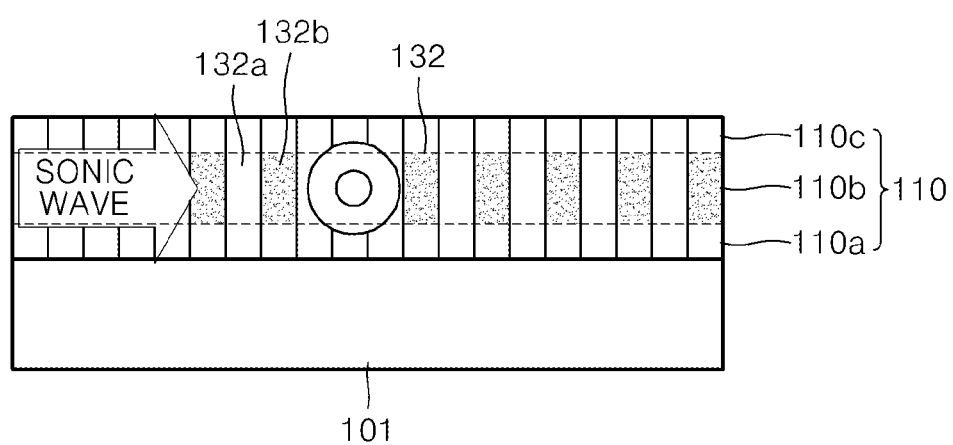
FIG. 6 is a cross-sectional view of the optical scanner of FIG. 4 taken in a direction perpendicular to a light travel direction.

FIG. 6 is a cross-sectional view of the optical scanner 100 of FIG. 4 taken in a direction that is perpendicular to a light travel direction, thereby illustrating a cross-section of the first acousto-optic device 132 disposed in the optical waveguide 110, where the first acousto-optic device 132 is the acousto-optic device of FIG. 1. Referring to FIG. 6, the first acousto-optic device 132 that is disposed in the optical waveguide 110 in the substrate 101 includes a first medium 132a and a second medium 132b that alternate with each other in a direction perpendicular to the light travel direction. The first medium 132a and the second medium 132b may be respectively the same as the first medium 11 and the second medium 12 that are described above with reference to FIG. 1. However, the first acousto-optic device 132 may be formed according to the embodiment of FIG. 3. In this case, the first medium 132a and the second medium 132b may be arrayed in the same direction as the first medium 13 and the second medium 14 described above with reference to FIG. 3, i.e., in a direction that is parallel to the light travel direction. As illustrated in FIG. 6, the first acousto-optic device 132 may be disposed in the core layer 110b, the first clad layer 110a, and the second clad layer 110c of the optical waveguide 110. However, the first acousto-optic device 132 may also be disposed only in the core layer 110b. In structure illustrated in FIG. 6, when sonic waves are applied to a surface of the first acousto-optic device 132 that is perpendicular to the light travel direction, light may be diffracted in the horizontal direction, and thus deflected in the horizontal direction. Although FIG. 6 illustrates only the first acousto-optic device 132, the aforementioned description may be equally applied to the second acousto-optic device 134. However, there is a difference in that the second acousto-optic device 134 is disposed to deflect the light in a vertical direction.

Thus, the optical scanner 100 of FIG. 4 may deflect incident light to predetermined angles in the horizontal and vertical directions according to an alternating current (AC) voltage applied to the first sonic wave generator 131 and an AC voltage applied to the second sonic wave generator 133. Also, by modulating a frequency of the AC voltage applied to the first sonic wave generator 131 and/or the AC voltage applied to the second sonic wave generator 133, the incident light may be horizontally and/or vertically scanned within a predetermined angle range. Although the optical scanner 100 of FIG. 4 includes both the first acousto-optic device 132 and the second acousto-optic device 134, in another embodiment, the optical scanner 100 may include only one acousto-optic device that scans light in only one of the horizontal and vertical directions, or may include a plurality of acousto-optic devices that each scan light in only one of the horizontal and vertical directions.

Figure 7:
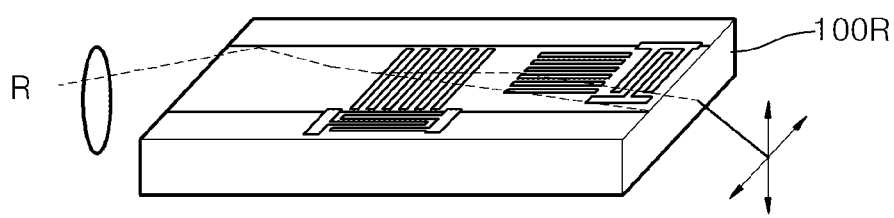
FIG. 7 illustrates a method of scanning a color image by using three optical scanners of FIG. 4.
Figure 7:
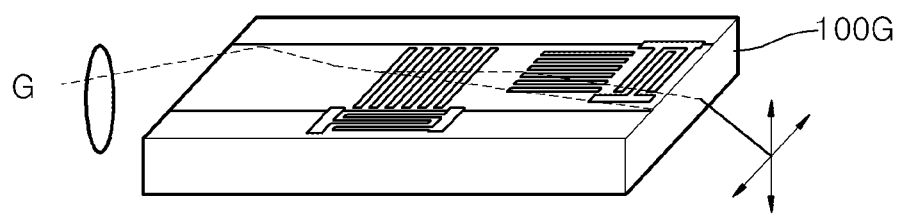
Figure 7:
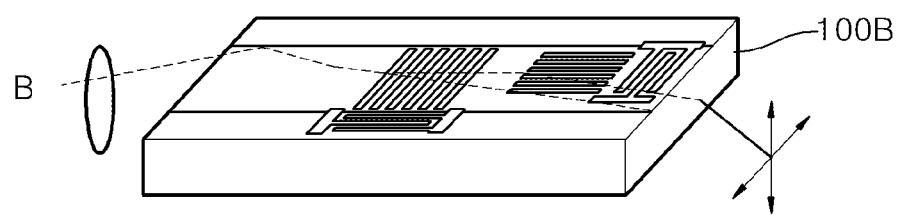

The optical scanner 100 of FIG. 4 may be applied to a laser image projecting apparatus. For example, as illustrated in FIG. 7, it is possible to display an image by scanning red laser light, green laser light, and blue laser light simultaneously on a screen (not shown) using three optical scanners 100R, 100G, and 100B, respectively.

Figure 8:
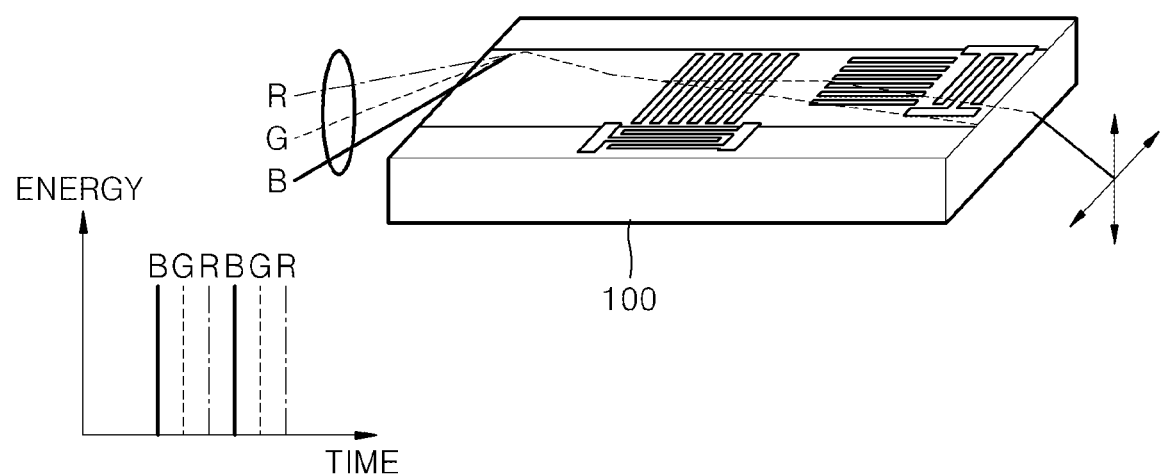
FIG. 8 illustrates another method of scanning a color image by using one optical scanner of FIG. 4.

Instead of using the three optical scanners 100R, 100G, and 100B, the laser image projecting apparatus may be formed using only one optical scanner. For example, as illustrated in FIG. 8, red laser light, green laser light, and blue laser light may be scanned sequentially on a screen (not shown) using only one optical scanner 100. That is, while an image of a frame is displayed, red laser light may be scanned during a first ⅓ period of a period (T seconds) of the frame (i.e., during T/3 seconds), green laser light may be scanned during a next ⅓ period of the frame, and then blue laser light may be scanned during a last ⅓ period of the frame. By doing so, the image may be displayed using only the one optical scanner 100. In this case, the optical scanner 100 may have an optical structure where laser light having different colors may be incident on the optical scanner 100 at different angles.

Figure 9:
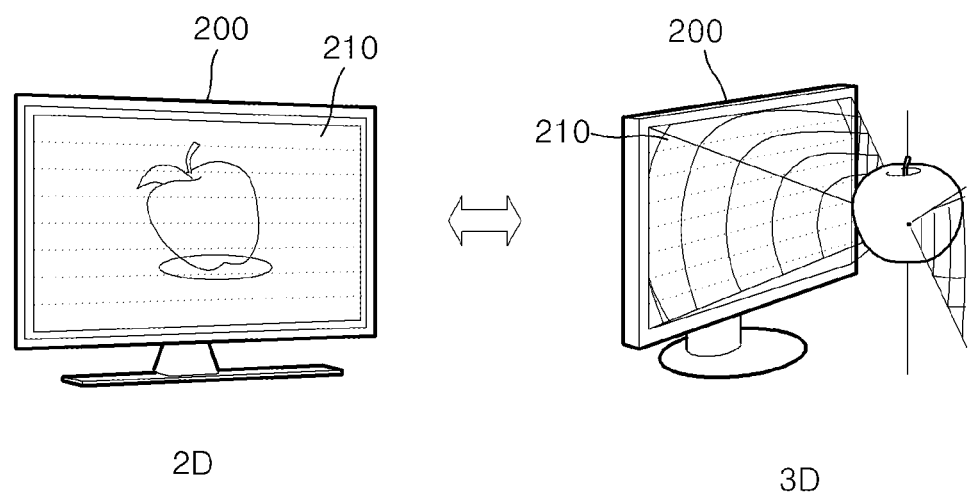

The acousto-optic device 10 of FIG. 1 and/or the acousto-optic device 20 of FIG. 3 may also be applied to a two-dimensional/three-dimensional (2D/3D) conversion stereoscopic image display apparatus. FIG. 9 illustrates an example in which the acousto-optic device 10 of FIG. 1 and/or the acousto-optic device 20 of FIG. 3 are applied to a 2D/3D conversion stereoscopic image display apparatus according to an embodiment of the invention. For example, a plurality of acousto-optic devices 210 that have a same height as a pixel of a display panel 200 and a same width as a display surface of the display panel 200 are manufactured, and the acousto-optic devices 210 are arrayed on a surface of the display panel 200 to form an array in a vertical direction. By doing so, one acousto-optic device 210 may correspond to one pixel row of the display panel 200 as illustrated in FIG. 9. Alternatively, one acousto-optic device 210 may correspond to a plurality of pixels forming a part of one pixel row of the display panel 200.

If sonic waves are not applied to the array of the acousto-optic devices 210, an image displayed on the display panel 200 is not deflected and passes through the array of the acousto-optic devices 210. In this case, as illustrated in a left diagram of FIG. 9, the 2D/3D conversion stereoscopic image display apparatus may operate in a 2D display mode. Alternatively, in a multi-view and stereoscopic image 3D display mode, sonic waves are applied to the array of the acousto-optic devices 210, causing each of the acousto-optic devices 210 to generate a plurality of light beams having a plurality of directions, and as illustrated in a right diagram of FIG. 9, a viewer may watch a 3D image.

Figure 10:
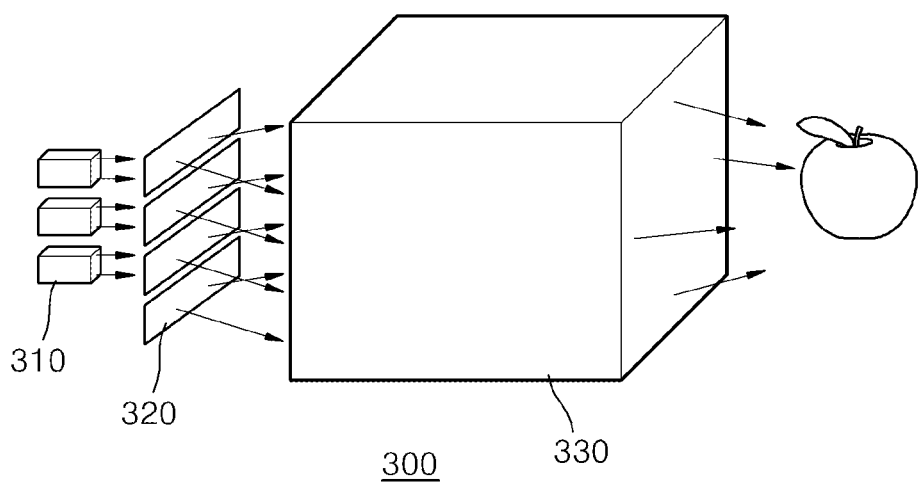

The acousto-optic device 10 of FIG. 1 and/or the acousto-optic device 20 of FIG. 3 may also be applied to a holographic 3D display apparatus. FIG. 10 illustrates an example in which the acousto-optic device 10 of FIG. 1 and/or the acousto-optic device 20 of FIG. 3 are applied to a holographic 3D display apparatus 300 according to an embodiment of the invention. For example, as illustrated in FIG. 10, the holographic 3D display apparatus 300 includes a light source 310, an array of a plurality of acousto-optic devices 320, and a projection optical system 330. The light source 310 may be an array of a plurality of lasers. Each of the acousto-optic devices 320 is manufactured to extend in a horizontal direction, and the acousto-optic devices 320 are arrayed in a vertical direction. One acousto-optic device 320 may correspond to one hologram row in a horizontal direction of a hologram image to be displayed by the holographic 3D display apparatus 300 as illustrated in FIG. 10. Alternatively, one acousto-optic device 320 may correspond to a part of one hologram row in the horizontal direction of the hologram image to be displayed by the holographic 3D display apparatus 300. Hologram rows that are diffracted from the acousto-optic devices 320 may be projected in a predetermined space by the projection optical system 330 and may form a stereoscopic image.

In the above description, references are made in detail to various embodiments of the nanostructured acousto-optic device, and the optical scanner, the optical modulator, and the holographic display apparatus using the nanostructured acousto-optic device. However, it should be understood that the embodiments described above should be considered in a descriptive sense only and not for purposes of limitation. Descriptions of features or aspects within each embodiment are to be considered as being applicable to other similar features or aspects in other embodiments. Furthermore, it would be appreciated by those skilled in the art that changes may be made in the embodiments described above without departing from the principles and spirit of the invention, the scope of which is defined by the claims and their equivalents.

What is claimed is:

1. An acousto-optic device comprising:
a first medium and a second medium repeatedly alternating with each other in a first direction; and
a sonic wave generator configured to apply sonic waves to the first medium and the second medium,
wherein a period in which a thickness of the first medium and a thickness of the second medium alternate with each other is smaller than a half of a wavelength of visible light to be controlled by the acousto-optic device,
wherein the acousto-optic device is configured to diffract light, the light being transmitted through sides of the acousto-optic device in a second direction transverse to the first direction in which the first medium and the second medium are alternately disposed, and
wherein the sides through which the light is transmitted are perpendicular to a side on which the sonic wave generator is disposed.

2. The acousto-optic device of claim 1, wherein the first direction is a propagation direction of the sonic waves applied by the sonic wave generator.

3. The acousto-optic device of claim 2, wherein:
the sonic wave generator is disposed on either one of:
a surface of the first medium, wherein the first medium precedes the second medium in the propagation direction of the sonic waves, and
a surface of the second medium, wherein the second medium precedes the first medium in the propagation direction of the sonic waves; and
the surface on which the sonic wave generator is disposed is perpendicular to the propagation direction of the sonic waves.

4. The acousto-optic device of claim 1, wherein the first medium is GaN, or Al1-xGaxN, or In1-xGaxN, ZnO, or an organic crystal and the second medium is Al, or Ag, or Au, or Cu, or Na, or ITO, or AZO, or GZO, or graphene, or an alloy of Al, or Ag, or Au, or Cu, or Na.

5. The acousto-optic device of claim 1, wherein the first medium and the second medium repeatedly alternate with each other in a direction that is perpendicular to a propagation direction of the sonic waves applied by the sonic wave generator.

6. The acousto-optic device of claim 5, wherein:
the sonic wave generator is disposed on a surface formed by alternating surfaces of the first medium and the second medium; and
the surface on or over which the sonic wave generator is disposed is perpendicular to the propagation direction of the sonic waves.

7. The acousto-optic device of claim 1, wherein the first medium has an acousto-optic coefficient larger than an acousto-optic coefficient of the second medium.

8. The acousto-optic device of claim 1, further comprising at least one additional medium repeatedly alternating with the first medium and the second medium and having a dielectric constant different from dielectric constants of the first medium and the second medium.

9. The acousto-optic device of claim 1, wherein the acousto-optic device is configured to diffract light incident on a light incident surface thereof, a travel direction of the incident light is transverse to a propagation direction of the sonic waves, and the diffracted light is output from a light exit surface of the acousto-optic device that is opposite to the light incident surface.

10. The acousto-optic device of claim 1, wherein the first medium has a dielectric constant with a real part having a first sign at the wavelength of the light to be controlled by the acousto-optic device; and
the second medium has a dielectric constant with a real part having a second sign opposite to the first sign at the wavelength of the light to be controlled by the acousto-optic device.

11. The acousto-optic device of claim 1, wherein the acousto-optic device has a refractive index anisotropy such that a diffraction angle range of the light diffracted by phase gratings formed in the first and second medium is greater than a diffraction angle range of light diffracted by phase gratings formed in only the first medium and is also greater than a diffraction angle range of light diffracted by phase gratings formed in only the second medium.

12. An optical scanner comprising:
an optical waveguide;
an optical coupling device configured to make light incident on the optical waveguide;
a first acousto-optic device comprising the acousto-optic device of claim 1 disposed in the optical waveguide and configured to deflect the light incident on the optical waveguide in a first direction; and
a second acousto-optic device comprising the acousto-optic device of claim 1 disposed in the optical waveguide and configured to deflect the light deflected by the first acousto-optic device in a second direction that is perpendicular to the first direction.

13. A two-dimensional/three-dimensional (2D/3D) conversion stereoscopic image display apparatus comprising:
a display panel; and
an acousto-optic device array disposed on an entire display surface of the display panel to deflect an image to be displayed on the display panel;
wherein the acousto-optic device array comprises a plurality of acousto-optic devices of claim 1.

14. A holographic display apparatus comprising:
a light source to emit light;
an acousto-optic device array to deflect the light emitted from the light source, the acousto-optic device array comprising a plurality of acousto-optic devices of claim 1; and
a projection optical system to project the light deflected by the acousto-optic device array.

15. The acousto-optic device of claim 1, wherein the first direction is a longitudinal direction, with the light being transmitted through lateral sides of the acousto-optic device.

16. An acousto-optic device comprising:
a first medium and a second medium repeatedly alternating with each other in a first direction to form a stacked structure, either one or both of the first medium and the second medium being formed of an acousto-optic medium; and
a sonic wave generator configured to apply sonic waves to the stacked structure to form a phase grating in the stacked structure, the phase grating diffracting light incident on the stacked structure,
wherein a period in which a thickness of the first medium and a thickness of the second medium alternate with each other is smaller than a half of a wavelength of visible light to be controlled by the acousto-optic device,
wherein the acousto-optic device is configured to diffract light, the light being transmitted through sides of the acousto-optic device in a second direction transverse to the first direction in which the first medium and the second medium are alternately disposed, and
wherein the sides through which the light is transmitted are perpendicular to a side on which the sonic wave generator is disposed.

17. The acousto-optic device of claim 16, wherein a diffraction angle of the light diffracted by the phase grating formed in the stacked structure is greater than a diffraction angle of light diffracted by a phase grating formed in only the first medium having a same period as the phase grating formed in the stacked structure, and is also greater than a diffraction angle of light diffracted by a phase grating formed in only the second medium having the same period as the phase grating formed in the stacked structure.

18. The acousto-optic device of claim 16, wherein the first medium has an acousto-optic coefficient larger than an acousto-optic coefficient of the second medium.

19. The acousto-optic device of claim 16, wherein:
the sonic generator is disposed on or over a first surface of the stacked structure that is parallel to a direction in which the first medium and the second medium repeatedly alternate with each other so that the first medium and the second medium repeatedly alternate with each other in the direction that is perpendicular to a propagation direction of the sonic waves; and
the light incident on the stacked structure is incident on a second surface of the stacked structure that is perpendicular to the first surface of the stacked structure.

20. An acousto-optic device comprising:
a first medium and a second medium repeatedly alternating with each other to form a stacked structure, the first medium and/or the second medium being formed of an acousto-optic medium; and
a sonic wave generator configured to apply sonic waves to the stacked structure to form a phase grating in the stacked structure, the phase grating diffracting light incident on the stacked structure,
wherein a period in which a thickness of the first medium and a thickness of the second medium alternate with each other is smaller than a half of a wavelength of visible light to be controlled by the acousto-optic device,
wherein the acousto-optic device is configured to diffract light that is transmitted through the acousto-optic device,
wherein:
the sonic generator is disposed on or over a first surface of the stacked structure that is perpendicular to a direction in which the first medium and the second medium repeatedly alternate with each other so that the first medium and the second medium repeatedly alternate with each other in a propagation direction of the sonic waves; and
the light incident on the stacked structure is incident on a second surface of the stacked structure in a direction transverse to the direction in which the first medium and the second medium repeatedly alternate,
wherein the second surface is perpendicular to the first surface.

21. An acousto-optic device comprising:

an acousto-optic medium comprising a first medium, a second medium and a third medium successively alternating in linear layers, the first medium being directly in contact with the second medium and the second medium being directly in contact with the third medium; and a sonic wave generator configured to apply sonic waves to the acousto-optic medium, wherein a period in which the first, second, and third mediums alternate with one another is smaller than a half of a wavelength of light to be controlled by the acousto-optic device, and wherein the acousto-optic device is configured to diffract light that is transmitted through the acousto-optic device.

22. An acousto-optic device, comprising:

a first medium and a second medium repeatedly alternating with each other in a lateral first direction; and a sonic wave generator configured to apply sonic waves to the first medium and the second medium, wherein a corresponding period in which a thickness of the first medium and a thickness of the second medium alternate with each other is smaller than a half of a wavelength of visible light to be controlled by the acousto-optic device, and wherein the acousto-optic device is configured to diffract the light, the light being transmitted through longitudinal sides of the acousto-optic device in a second direction transverse to the first direction in which the first medium and the second medium are alternately disposed, and wherein the longitudinal sides through which the light is transmitted are perpendicular to a side on which the sonic wave generator is disposed.

* * * * *